United States Patent
Perrotta et al.

(10) Patent No.: US 6,402,812 B1
(45) Date of Patent: Jun. 11, 2002

(54) FILTERED ENVIRONMENTAL CONTROL SYSTEM

(75) Inventors: Thomas Perrotta, Brookfield; Clement I. Anekwe, Stratford, both of CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/843,267

(22) Filed: Apr. 25, 2001

(51) Int. Cl.[7] .............................. B01D 53/04; F25D 9/00
(52) U.S. Cl. .................. 95/95; 95/148; 95/273; 96/128; 96/130; 55/385.2; 62/401; 454/71
(58) Field of Search .......................... 95/95, 148, 273, 95/284; 55/385.2; 96/128, 144, 130; 454/71, 76, 70; 62/78, 401, 402, DIG. 5

(56) References Cited

U.S. PATENT DOCUMENTS

| | | | |
|---|---|---|---|
| 4,769,051 A | | 9/1988 | Defrancesco |
| 4,793,832 A | * | 12/1988 | Veltman et al. |
| 5,154,065 A | * | 10/1992 | Herman |
| 5,267,449 A | * | 12/1993 | Kiczek et al. |
| 5,323,624 A | | 6/1994 | Schwalm |
| 5,327,744 A | | 7/1994 | Frawley et al. |
| 5,887,445 A | * | 3/1999 | Murry et al. |
| 6,257,003 B1 | * | 7/2001 | Hipsky |

* cited by examiner

Primary Examiner—Duane Smith
Assistant Examiner—Frank M. Lawrence
(74) Attorney, Agent, or Firm—Carlson Gaskey & Olds, PC

(57) ABSTRACT

An integrated environmental control (IEC) system includes a decontamination Pressure Swing Adsorption (PSA) system in which a contaminated decontamination bed is purged through a purge exhaust duct and subsequently dumped overboard through a purge ejector. The energy from a high pressure drain duct serves as the primary motive force for the purge ejector to create a sub-atmospheric region therein and reduce back pressure upon the PSA filtration system. The reduced back pressure creates additional pressure drop across the PSA filtration system which improves performance. Risk of the purge exhaust duct and the purge ejector freezing in a low temperature environment is further minimized by mixing the purge exhaust with the relatively warmer high pressure drains.

21 Claims, 3 Drawing Sheets

FILTERED ENVIRONMENTAL CONTROL SYSTEM

This invention was made with government support under Contract No.: DAAJ09-91C-A004 awarded by the Department of the Army. The government therefore has certain rights in this invention.

BACKGROUND OF THE INVENTION

The present invention is directed to environmental control systems, and more particularly, to a purge ejector for a pressure swing adsorption (PSA) NBC filtration system which communicates with high-pressure drain ducts.

Modem vehicles generate a large quantity of thermal energy that must be effectively dissipated, i.e., by cooling, to ensure continuous, reliable operation of the avionics/electronic modules. To dissipate such thermal energy, vehicles typically include an environmental control system (ECS) that provides a temperature/pressure regulated airflow for cooling of the avionics/electronic modules. The regulated airflow is generally further utilized for crew comfort, and may be used for over pressurization to preclude contaminant infiltration.

Military vehicles in particular maybe exposed to chemical, biological, and/or nuclear hazards. As a result, such vehicles are typically equipped with a nuclear/biological/chemical life support system (NBC LSS) to facilitate operations under such hazardous conditions. The NBC LSS ensures that NBC particulates/contaminants are removed from the airflow processed by the ECS. Integrated environmental control systems typically combine the ECS and the NBC LSS functions into a single integrated environmental control system that provides a decontaminated, cooled airflow for cooling of avionics/electronic modules and crew comfort.

It is known to utilize a pressure swing adsorption (PSA) NBC filtration system as part of an integrated environmental control system. PSA performance is affected by the difference in adsorb and desorb pressures and the quantity of airflow used to purge contaminants. The greater the difference (pressure swing), or the higher the purge flow, the better the PSA performance. The desorb process is endothermic and as the pressure swing or purge flow is increased there maybe an increased likelihood of a purge exhaust duct freezing in a low temperature environment. Thus, to increase the pressure swing or purge flow while minimizing the likelihood of freezing, a larger ducting system must be supplied which results in an undesirable weight increase.

A need therefore exists to provide an integrated environmental control system that has increased operating efficiency, a lower overall system weight, and a minimized risk of freezing in low temperature environments.

SUMMARY OF THE INVENTION

The integrated environmental control (IEC) system according to the present invention includes a decontamination Pressure Swing Adsorption (PSA) system in which a contaminated decontamination bed is purged through a purge exhaust duct. The contaminated airflow passes through the purge exhaust duct and is subsequently dumped overboard through a purge ejector. A high pressure drain duct such as a water separator drain duct and/or a High Efficiency Particulate Air (HEPA) filter drain duct communicate with the purge ejector.

The energy from the water separator drain duct and the filter drain duct serve as the primary motive force for the purge ejector to create a sub-atmospheric region therein and reduce back pressure upon the PSA filtration system. The reduced back pressure essentially creates additional pressure drop across the PSA filtration system which improves PSA filtration system performance. This, in turn, means that smaller components maybe used for system flow ducting or greater purge flow for the same passageways. A significant reduction in overall weight of the IEC system is thereby provided.

The water separator drain duct and the filter drain duct are not subjected to the endothermic desorption process of the PSA filtration system prior to being mixed in the purge ejector with the relatively colder contaminated airflow exhausted from the PSA system. Risk of the purge exhaust duct and the purge ejector freezing in a low temperature environment is thereby minimized.

In another embodiment of the instant invention, the purge ejector communicates with a ram air duct to further intensify the sub-atmospheric region and the pressure swing.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
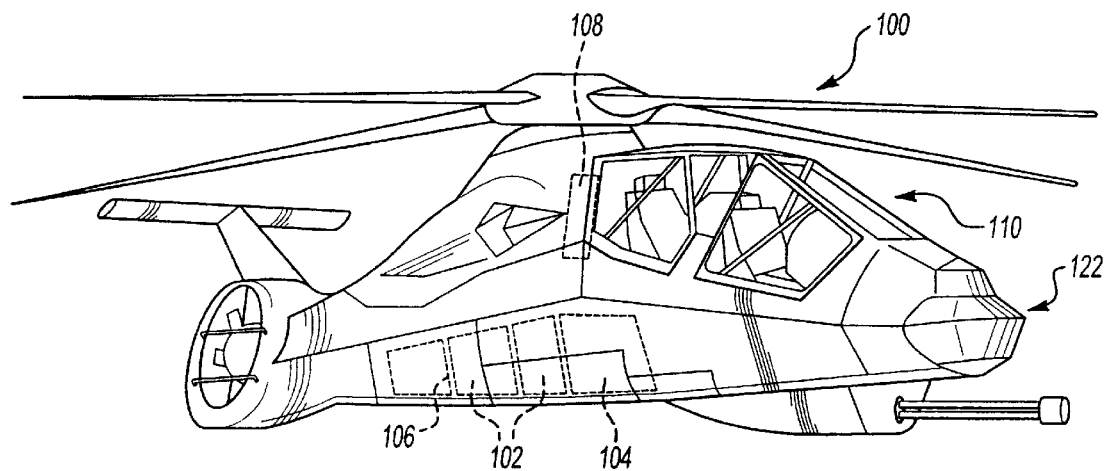
FIG. 1 is a perspective view of a vehicle such as the RAH-66 Comanche helicopter with an integrated environmental control system according to the present invention.
Figure 2A:
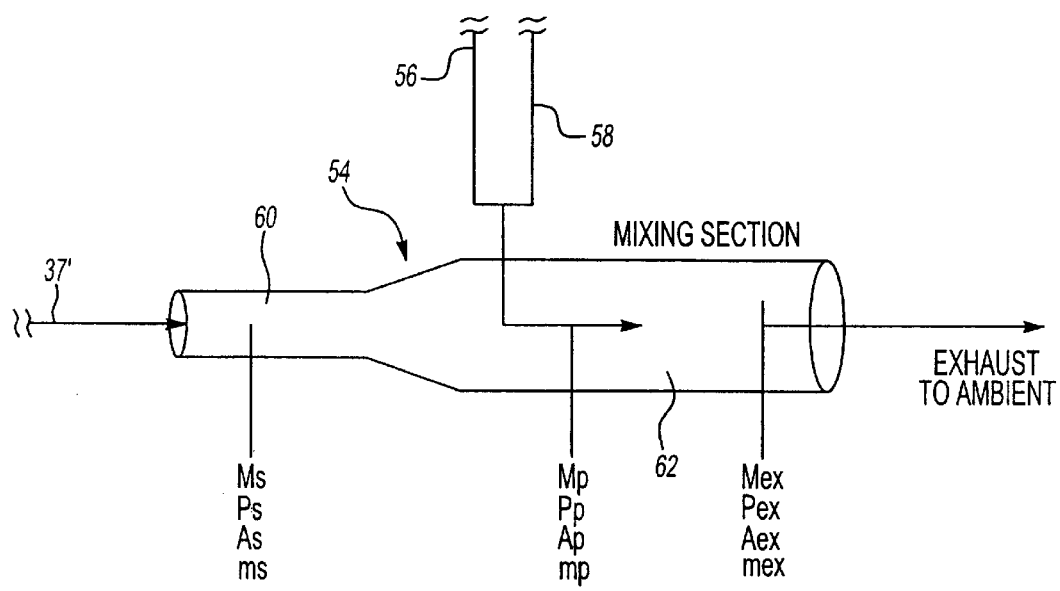
FIG. 2A is an expanded schematic view of a purge ejector for the integrated environmental control system illustrated in FIG. 2.
Figure 2:
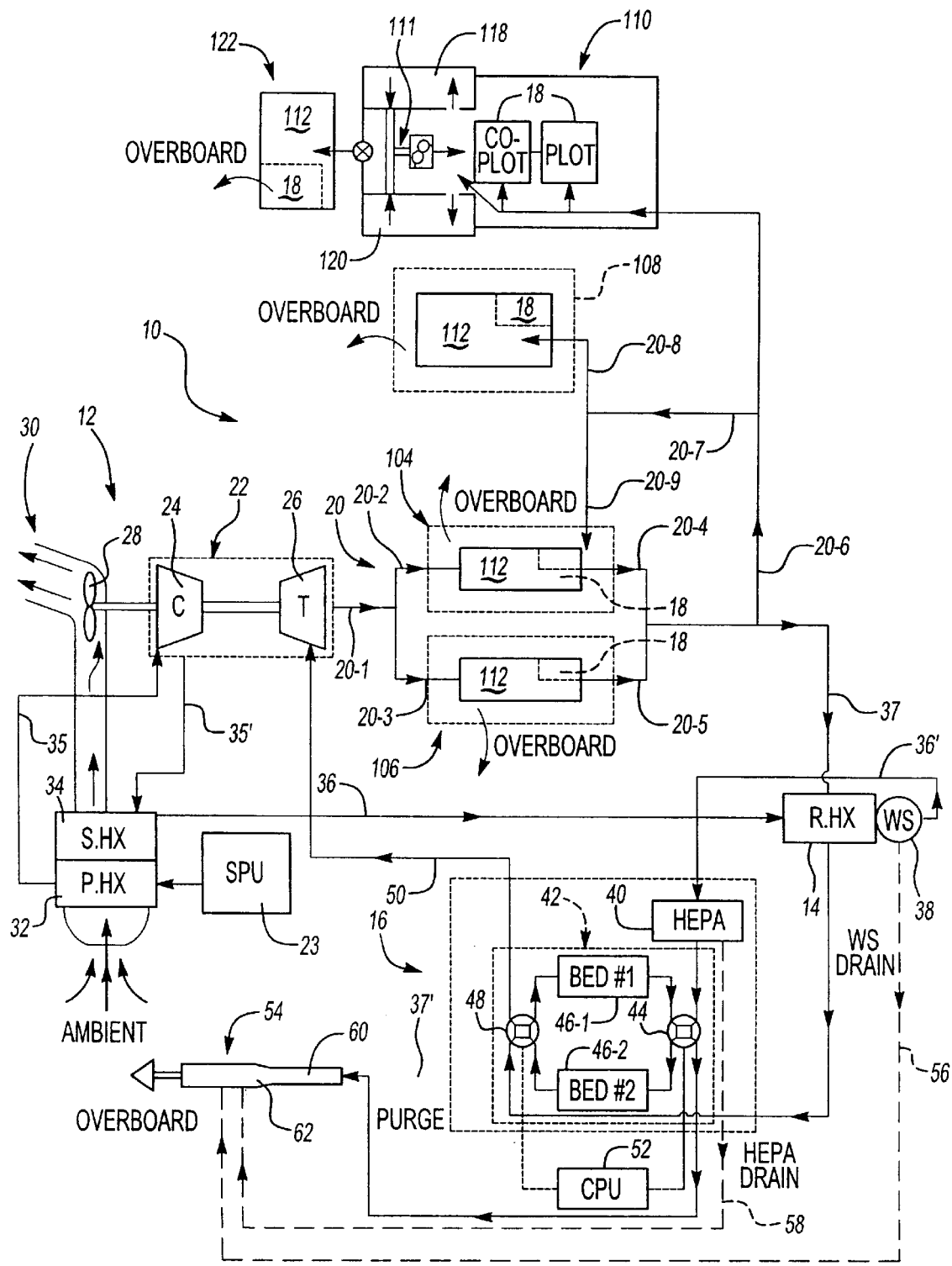
FIG. 2 is a schematic block diagram of an integrated environmental control system according to the present invention.

FIG. 1 schematically illustrates a vehicle 100 such as a RAH-66 Comanche helicopter 100 which includes line-replaceable avionics/electronic modules (illustrated generally at 102) located for easy accessibility in the fuselage in left and right mission equipment package (MEP) bays 104, 106 (FIG. 2). Additional avionics/electronic modules are located in a mid MEP bay 108 located adjacent the vehicle cockpit 110. Further avionics/electronic modules are located within the cockpit 110. It should be understood that although a particular vehicle is disclosed in the illustrated embodiment, other vehicles will benefit from the instant invention.

Referring to FIG. 2, an integrated environmental control (IEC) system 10 includes an environmental control system (ECS) and a nuclear/biological/chemical life support system (NBC LSS). The IEC system 10 provides super-cooled, super-dry, decontaminated airflow, in seriatim, to heat loads such as the left and right MEP bays 104, 106 and to the cockpit 110 for cooling of avionics/electronic modules and crew comfort. The IEC system 10 is further operative to provide cooled, super-dry, decontaminated airflow for cooling the avionics/electronic modules in the mid MEP bay 108 and for over pressurizing the cockpit 110 and the left and right MEP bays 104, 106 to prevent contaminant infiltration thereof.

The IEC system 10 generally includes a refrigerant subsystem 12 which is operative to provide compressed airflow to a regenerative heat exchanger 14 which, with the decontamination system 16, provides conditioned airflow to heat loads (illustrated schematically at 18) through the airflow distribution network 20.

The refrigerant system 12 includes an air cycle machine (ACM) 22 preferably driven by a subsystem power unit (SPU; illustrated schematically at 23), which is functionally similar to an auxiliary power unit (APU). It should be realized that other power sources may drive the system 10 such as a vehicle engine, APU, or dedicated source. The ACM 22 includes a compressor stage 24, a turbine stage 26 and a fan 28. The regenerative heat exchanger 14 and the decontamination subsystem 16 are operatively interposed between the compressor stage 24 and the turbine stage 26 of the ACM 22.

The fan 28 draws ambient air from the atmosphere through a ram air duct 30. A primary heat exchanger 32 and a secondary heat exchanger 34 are disposed upstream of the fan 28. Relatively cold ram air traverses the heat exchangers 32, 34 in indirect heat exchange relationship with relatively hot compressed air from the SPU 23 to thereby draw heat therefrom. The fan 28 preferably assists in venting the air that traverses the heat exchangers 32, 34 overboard.

Compressed air from the SPU 23 is directed through the primary heat exchanger 32, wherein it is cooled by transferring heat to the ram air duct 30. Flow duct 35 supplies the compressed air from the primary heat exchanger 32 to the compressor 24 of the ACM 22. The compressed air is discharged from the compressor 24 through flow duct 35 to pass through the secondary heat exchanger 34 wherein it is cooled to remove the heat gained during compression. From the secondary heat exchanger 34 the compressed air is supplied to the regenerative heat exchanger 14 through duct 36. Water maybe sprayed into the secondary and primary heat exchanger to increase the cooling provided by the heat exchanger.

Heat is transferred from the compressed air by the ram air duct 30, the primary heat exchanger 32 and the secondary heat exchanger 34. Further, sufficient heat may then be removed by the regenerative heat exchanger 14 such that water vapor therein condenses. A water collection system 38 is provided downstream of the regenerative heat exchanger 14 and upstream of the decontamination system 16. The compressed air passes through the water collection system 38 which removes any condenses water droplets from the air. The dehumidified, partially cooled compressed air then passes into the decontamination system 16 for removal of contaminants therein.

The nuclear, biological, chemical (NBC) decontamination system 16 of the IEC system 10 preferably includes a high efficiency particulate air (HEPA) filter 40, and a twin bed pressure swing absorber (PSA) 42, such as the PSA filtration system commercially available from the Pall Corporation, of Glen Cove, N.Y. The PSA filtration system 42 includes an inlet transfer valve 44, two regenerative beds 46-1, 46-2, and an outlet transfer valve 48. The decontamination system 16 is operative to remove particulate, liquid, and/or gaseous contaminants from the highly compressed airflow provided by the duct 36'. In addition, the PSA system 42 removes substantially all moisture content from the highly compressed airflow.

Purge duct 37 accommodates purge airflow bled from the airflow distribution network 20, the purge airflow being utilized for purging the decontamination subsystem 16, as further described herein below.

Inlet transfer valve 44 is operative to alternatively direct the compressed airflow from the water collection system 38 through flow duct 36' and the HEPA filter 40 then to one of beds (46-2 as illustrated in FIG. 2) of the PSA apparatus 16. Particulate, liquid, gaseous contaminants, and moisture content, of the highly compressed airflow are removed therefrom by the HEPA filter 40 and the active bed (46-2) to supply decontaminated air flow to the turbine 26 for expansion. Inlet transfer valve 44 simultaneously directs purge airflow from the other bed (46-1 as illustrated in FIG. 2) to the purge flow duct 37'. Concomitantly, the contaminated bed (46-1) is being purged of entrapped contaminants by means of the purge airflow from purge duct 37.

Once the active bed is saturated, and/or the contaminated bed is purged of contaminants, the inlet transfer valve 44 is activated to redirect the highly compressed airflow and the purge airflow through the newly-purged bed and the newly-contaminated bed, respectively. The HEPA filter 40 and the two regeneration beds 46-1, 46-2 thus provide for continuous decontamination of the highly compressed airflow from the compressor stage 24 of the ACM 22.

Outlet transfer valve 48 operates to direct purge airflow from purge exhaust duct 37 to contaminated bed 46-1, The outlet transfer valve 48 is concomitantly operative to direct the super-dry, decontaminated airflow produced by the PSA apparatus 16 to the turbine stage 26 of the ACM 22 through duct 50. A controller 52, such as the automatic flight control system computer or the like synchronously regulates the switching operations of the inlet and outlet transfer valves 44,48 to accommodate the foregoing functions.

The turbine stage 26 is operative to extract thermal energy from the super-dry, decontaminated airflow from flow duct 50 (by expansion of the super-dry, decontaminated airflow) to provide a super-cooled, super-dry, decontaminated airflow to the airflow distribution network 20. Preferably, the super-cooled, super-dry, decontaminated airflow provided by the turbine stage 26 to the airflow distribution network 20 at airflow duct 20-1, has a temperature of approximately −30.degree. F. to −50.degree. F., and a pressure of about 3–5 psig. The turbine stage 26 also provides the necessary power to drive the compressor stage 24 and fan 28.

The airflow distribution network 20 includes a plurality of distribution ducts 20-1–20-9 that are operative to channel the super-cooled, super-dry, decontaminated airflow from the refrigerant subsystem 12, to various heat loads 18 within the vehicle. The airflow distribution network 20 provides the conditioned airflow to the MEP bays 104, 106, the cold plates 112, and the cockpit 110 for crew comfort. Airflow within the cockpit 110 is further circulated through avionics/equipment bays 118, 120 in the cockpit 110 for cooling of avionics/electronic modules disposed therein. The cooling airflow channeled into the avionics/equipment bays 118, 120 may be recirculated into the cockpit 110 proper by a circulation subsystem 111. The cockpit 110 may further channel cockpit cooling airflow to a sensor system 122 (also schematically illustrated in FIG. 1) for cooling thereof, such airflow being subsequently dumped overboard.

The coldplates 112 ensure that the super-cooled, super-dry, decontaminated airflow is not physically exposed to any contaminants remaining in the left and right MEP bays 104 and 106. It will be appreciated, however, that the conditioned airflow may alternatively or additionally be directed through the avionics/electronic modules for convective cooling thereof. A diverter duct 20-7 is preferably interconnected to the common distribution duct 20-6 to bleed off a portion of the cooled, super-dry, decontaminated airflow for cooling the avionics/electronic modules in the mid MEP bay 108 and for over pressurizing the left and right MEP bays 104, 106. It will be appreciated that other heat load configurations within other vehicles will benefit from the instant invention. For further understanding of other aspects of the airflow distribution networks and associated components thereof, attention is directed to U.S. Pat. No. 5,327,744 which is assigned to the assignee of the instant invention and which is hereby incorporated herein in its entirety.

A purge duct 37 described hereinabove is interconnected to the common distribution duct 20-6 downstream of the left and right MBP bays 104, 106 to bleed off a portion of the cooled, super-dry airflow to provide the purge airflow for the purging process of the PSA system 16. Contaminated purge airflow from the contaminated bed which is being purged is exhausted from the PSA system 16 through purge exhaust duct 37' and subsequently dumped overboard through purge ejector 54.

A water separator drain duct 56 communicates with the water separator 38 to drain fluid and high pressure air from the system. A filter drain duct 58 communicates with the HEPA filter 40 to drain fluid and high pressure air from the system. Preferably, the water separator drain duct 56 and the filter drain duct 58 communicates with the purge ejector 54 to form a sub-atmospheric region therein. The purge exhaust duct 37' preferably communicates with the secondary flow path 60 (FIG. 2A) of the purge ejector 54 while the water separator drain duct 56 and the filter drain duct 58 communicates with a primary flow path 62 or mixing section of the purge ejector 54.

As known, ejectors transfer momentum from one fluid to another by fluid shear in a mixing process. Referring also to FIG. 2A. the primary flow path 62 defines a primary pressure (Pp), a primary flow Mach number (Mp) and a primary mass flow (mp). The secondary flow path 60 defines a secondary pressure (Ps), a secondary flow Mach number (Ms) and a secondary mass flow (ms). Thus, the addition of the primary and secondary flow paths results in an exhaust flow path of an exhaust pressure (Pex), an exhaust flow Mach number (Mex) and an exhaust mass flow (mex). It will be realized that standard ejector design methodology will be used to define the ejector primary to secondary ratio (Ap/As) and mixing duct length to optimize the exhaust pressure (Pex), exhaust flow Mach number (Mex) and the exhaust mass flow (mex) to optimize the sub-atmospheric pressure region within the purge duct 54.

The energy from the water separator drain duct 56 and the filter drain duct 58 serve as the primary motive force for the purge ejector 54 to create the sub-atmospheric region and reduce back pressure upon the PSA filtration system 42. It should be appreciated that other high pressure drain lines will benefit from the present invention. The reduced back pressure essentially creates additional pressure drop across the PSA filtration system 42 which increases the volumetric flow rate from the contaminated bed (46-1) that is being purged. In other words, a greater pressure drop across the PSA filtration system 42 is provided for a given flow, i.e., Ppin–Ppout where:

Ppin=PSA purge inlet pressure; and

Ppout=PSA purge exhaust pressure (sub-atmospheric).

This, in turn, means that smaller diameter components may be used for system flow ducting or greater purge flow for the same passages. A significant reduction in overall weight of the EEC system 10 is thereby provided.

The desorption process for the purging of the contaminated bed (46-1) is endothermic and the fluid stream passing into the purge exhaust duct 37' is relatively cooler and has a relative greater concentration of water vapor than when the fluid entered the PSA filtration system 42 through purge duct 37. The water separator drain duct 56 and the filter drain duct 58 are not subjected to the endothermic desorption process of the PSA filtration system 42 and have a fluid stream which is warmer than the fluid stream passing into the purge exhaust duct 37'. Preferably,the airflow within flow duct 36' has a temperature of approximately 75°–130° F., and a pressure of about 65–100 psig. The flow from the water separator drain duct 56 and the filter drain duct 58 are mixed with the relatively colder purge exhaust duct 37' in the purge ejector 54. Risk of purge exhaust duct 37' and the purge ejector 54 freezing in a low temperature environment is thereby minimized.

Figure 3:
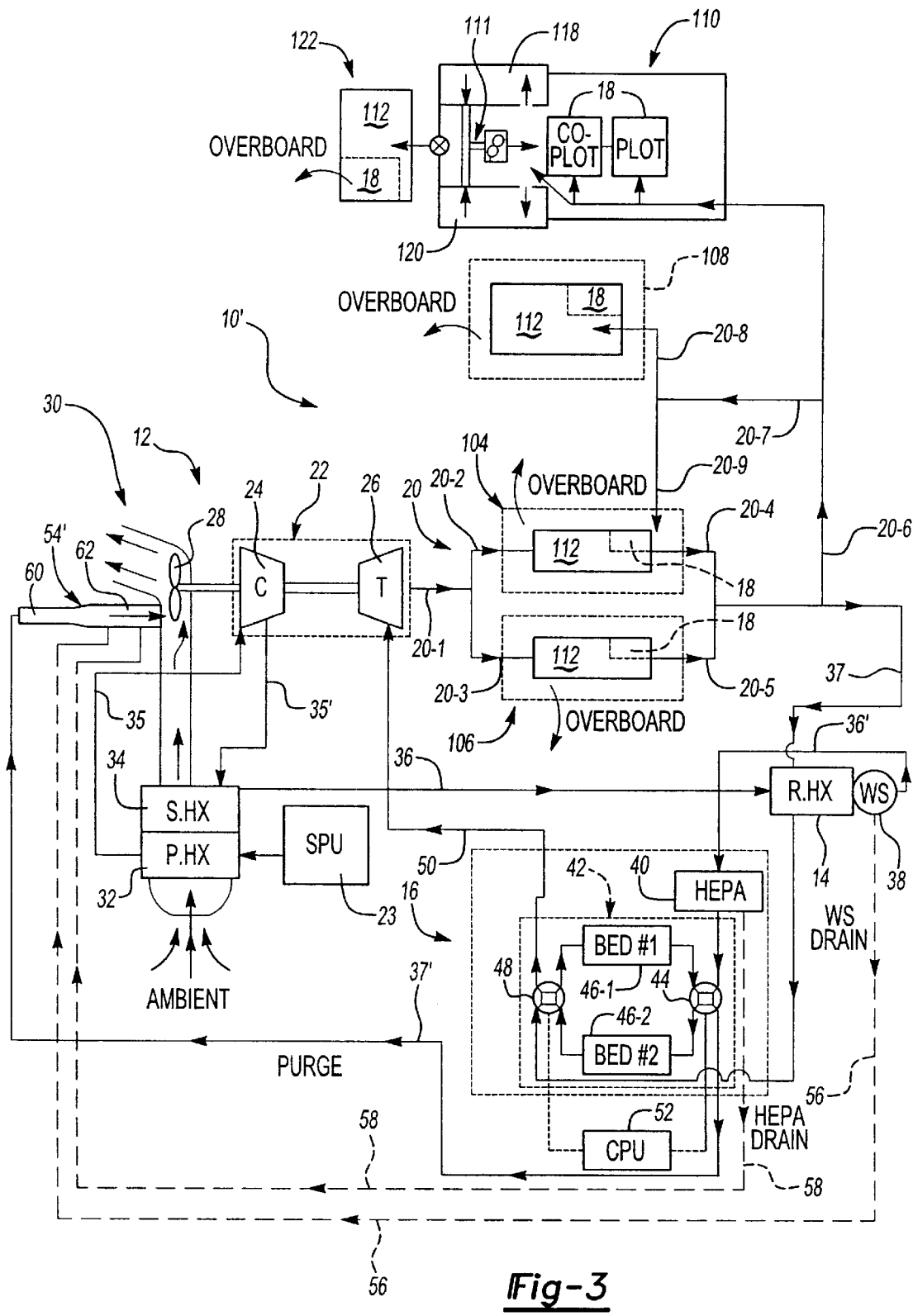
FIG. 3 is a schematic block diagram of another integrated environmental control system according to the present invention.

Referring to FIG. 3, another embodiment of an IEC system 10' is illustrated using like numerals as FIG. 2. The IEC system 10', however, includes a purge ejector 54' which communicates with the ram air duct 30 to further increase the subatmosperic region. It will be appreciated that the primary to secondary ratio (Ap/As) and mixing duct length for the purge ejector 54' may be different from that of FIG. 2 to account for the purge ejector 54 discharging into the ram air duct 30. Preferably, by discharging the purge ejector 54' into the ram air duct 30, the sub-atmospheric region is further intensified.

The foregoing description is exemplary rather than defined by the limitations within. Many modifications and variations of the present invention are possible in light of the above teachings. The preferred embodiments of tis invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of purging a pressure swing adsorption decontamination system for a vehicle comprising the steps of:
   (1) purging contaminated airflow from the pressure swing adsorption decontamination system through a secondary flow path of a purge ejector; and
   (2) communicating a high pressure drain flow through a primary flow path of the purge ejector to form a sub-atmospheric region therein.

2. A method as recited in claim 1, further including the step of communicating decontaminated airflow to the pressure swing adsorption decontamination system to perform said step (1).

3. A method as recited in claim 1, wherein said step (2) includes separating water vapor from a contaminated airflow to obtain the high pressure drain flow therefrom.

4. A method as recited in claim 1, wherein said step (2) includes filtering a contaminated airflow to obtain said high pressure drain flow therefrom.

5. An integrated environmental control system for a vehicle, comprising:
   a decontamination system operative to decontaminate a compressed fluid;
   an airflow distribution network in communication with said decontamination system to distribute a decontaminated fluid from said decontamination system to a heat load;

a purge exhaust duct in communication with said decontamination system, said purge exhaust duct having a purge ejector to exhaust a contaminated fluid from said decontamination system; and a drain duct in communication with said purge ejector to form a sub-atmospheric region therein.

6. The integrated environmental control system as recited in claim 5, wherein said drain duct communicates with a primary flow path of said purge ejector.

7. The integrated environmental control system as recited in claim 5, wherein said purge exhaust duct communicates with a secondary flow path of said purge ejector.

8. The integrated environmental control system as recited in claim 5, wherein said drain duct is a drain duct from a water separator.

9. The integrated environmental control system as recited in claim 8, wherein said water separator communicates with a regenerative heat exchanger.

10. The integrated environmental control system as recited in claim 5, wherein said drain duct is a drain duct from a HEPA filter.

11. The integrated environmental control system as recited in claim 5, wherein said purge exhaust duct includes a drain duct from a water separator and a drain duct from a HEPA filter.

12. The integrated environmental control system as recited in claim 5, further including a purge duct in communication with said airflow distribution network to provide a purge airflow to said decontamination system.

13. The integrated environmental control system as recited in claim 5, wherein said purge ejector communicates with a ram air duct.

14. The integrated environmental control system as recited in claim 5, further including a refrigerant system having an air conditioning machine.

15. The integrated environmental control system as recited in claim 14, wherein said air conditioning machine includes a turbine stage and a compressor stage.

16. An integrated environmental control system for a vehicle, comprising:

a refrigerant system operative to provide a compressed airflow;

a pressure swing adsorption decontamination system having an inlet transfer valve, a first and a second regenerative bed, and an outlet transfer valve to decontaminate said compressed airflow from said refrigerant system;

an airflow distribution network in communication with said outlet transfer valve to distribute decontaminated airflow from one of said first and second regenerative beds to a heat load;

a purge exhaust duct in communication with said outlet transfer valve, said purge exhaust duct having a purge ejector to selectively exhaust contaminated airflow from one of said second and first regenerative beds;

a HEPA filter in communication with said inlet transfer valve, said HEPA filter having a HEPA filter drain duct in communication with said purge ejector to form a sub-atmospheric region therein; and a water separator in communication with said HEPA filter, said water separator having a water separator drain duct in communication with said purge ejector to form a sub-atmospheric region therein.

17. The integrated environmental control system as recited in claim 16 wherein said HEPA filter drain duct and said water separator drain duct communicates with a primary flow path of said purge ejector.

18. The integrated environmental control system as recited in claim 16, wherein said purge exhaust duct communicates with a secondary flow path of said purge ejector.

19. The integrated environmental control system as recited in claim 16, wherein said purge ejector communicates with a ram air duct.

20. The integrated environmental control system as recited in claim 16, further including a controller to selectively activate said inlet and said outlet transfer valves to alternate between said first and second regenerative beds.

21. The integrated environmental control system as recited in claim 16, wherein said water separator communicates with a regenerative heat exchanger.

* * * * *